United States Patent

Bitzer et al.

[11] Patent Number: 5,824,275
[45] Date of Patent: Oct. 20, 1998

[54] SECONDARY AND TERTIARY AIR NOZZLE FOR FURNACE APPARATUS

[75] Inventors: Alan S. Bitzer; George J. Prohazka, both of Simsbury, Conn.

[73] Assignee: Combustion Engineering, Inc., Windsor, Conn.

[21] Appl. No.: 399,669

[22] Filed: Mar. 7, 1995

Related U.S. Application Data

[63] Continuation of Ser. No. 998,966, Dec. 29, 1992, abandoned.

[51] Int. Cl.$^6$ .................................................... B09B 3/00
[52] U.S. Cl. .................... 422/184; 110/147; 110/163; 110/182; 110/297; 122/6 A; 122/7 C; 162/30.1
[58] Field of Search ............... 126/110 A; 162/30.1, 162/30.11; 110/147, 158, 163, 174, 175 R, 175 A, 182, 182.5, 297; 122/6 A, 7 C; 422/184

[56] References Cited

U.S. PATENT DOCUMENTS

| | | | |
|---|---|---|---|
| 515,054 | 4/1894 | Norcloss | 110/297 |
| 2,520,994 | 9/1950 | Biegal | 110/175 |
| 2,549,212 | 4/1951 | McKeague | 110/175 R |
| 2,683,429 | 7/1954 | Steuerman | 110/175 |
| 3,403,642 | 10/1968 | Parkin | 122/7 C |
| 3,404,663 | 10/1968 | Lewis et al. | 122/7 C |
| 3,413,936 | 12/1968 | Matthews | 122/7 C |
| 3,625,186 | 12/1971 | Herbet | 122/7 C |
| 3,703,919 | 11/1972 | Owens et al. | 122/7 C |
| 4,030,479 | 6/1977 | Webb | 110/158 |
| 4,085,708 | 4/1978 | Ashdown | 122/7 B |
| 4,480,558 | 11/1984 | Russell | 110/297 |
| 4,526,160 | 7/1985 | Ickes | 126/292 |
| 4,545,308 | 10/1985 | Zaterka | 110/182.5 |
| 4,748,004 | 5/1988 | Goodspeed | 422/185 |
| 4,838,182 | 6/1989 | Goodspeed | 110/182.5 |
| 4,846,080 | 7/1989 | Ross et al. | 110/182.5 |
| 4,940,004 | 7/1990 | Jansen | 110/182.5 |
| 5,001,992 | 3/1991 | Higgins et al. | 110/182.5 |
| 5,022,331 | 6/1991 | Simonen | 110/297 |
| 5,044,327 | 9/1991 | Hunt | 110/182.5 |
| 5,167,192 | 12/1992 | Pingel et al. | 110/163 |

*Primary Examiner*—Timothy McMahon
*Attorney, Agent, or Firm*—Robert S. Smith, Esq.

[57] ABSTRACT

An air nozzle assembly for use in associated combustion apparatus which includes a first elongated housing having first and second axial extremities. The first axial extremity thereof is open to the interior of the first housing and tapers axially from a larger to a smaller cross section that constitutes a generally flat nozzle at the first axial extremity. A second elongated housing has first and second axial extremities. The fist axial extremity is open to the interior of the second housing, at least the first axial extremity and an axial portion of the second elongated housing are dimensioned and configured to extend with at least the first axial portion disposed within the first elongated housing. The first axial portion tapers axially from a larger to a smaller cross section at the first axial extremity. The apparatus also includes means for selectively preventing flow in the second elongated housing.

19 Claims, 2 Drawing Sheets

SECONDARY AND TERTIARY AIR NOZZLE FOR FURNACE APPARATUS

This is a continuation of application Ser. No. 07/998,966, filed Dec. 29, 1992.

BACKGROUND INVENTION

The invention relates to nozzles used in furnace apparatus. While the invention has particular application to chemical recovery units it also has application to other slagging furnaces and other furnace apparatus. Chemical recovery units utilize the liquor obtained from the digestion of wood or other cellulose material with certain chemicals, as is the practice in the pulp industry. The liquor in such processes is introduced into the furnace of the unit. The burnable portion of the liquor is burned and the chemicals in the liquor are smelted and drawn off of the lower end of the furnace. In typical chemical recovery units the heat that is evolved by burning the liquor is used to generate steam by passing the combustion gas over suitable heat exchange surfaces.

In the operation of chemical recovery units the residual liquor is sprayed into the furnace, this residual liquor often has a substantial moisture content. Most of the moisture is driven from the liquor spray upon the introduction of the liquor into the furnace because of the high temperature in the furnace. The hot gases will pass upwardly through the furnace. The remaining solid particles fall onto the furnace hearth and form a pile. During the descent to the hearth some of the volatile substances are driven from these solid particles. The combustible material in the solids is burned in the pile that forms on the hearth. This combustion is supported by the introduction of preheated primary air which is directed generally over and upon this pile of material. After the volatile matter and the combustibles contained in this solid material are burned there remains upon the hearth only the non-combustible material which includes the chemicals that are to be recovered along with the traces of various impurities with those being smelted upon the hearth and removed through a suitable spout. Since the solid material that descends to the hearth is very light and fluffy, some of this material is entrained in the upwardly moving stream of combustion gases that passes up through the furnace. The entrained material includes chemicals which are softened or melted in their upward ascent in the furnace.

In addition to primary air referred to above it is common practice to provide secondary and tertiary air for the combustion process. The present invention has particular application to controlling the flow of such air.

In the operation of a slagging furnace, such as a chemical recovery furnace, the amount of combustion air required is proportional to the quantity of fuel being burned. The conventional nozzles through which air is introduced are fixed in number and fixed in area. They cannot be closed off in operation. In such nozzles air velocity through the nozzle will therefore be a function of the quantity of the fuel being burned. This means that the penetration of the air stream from the respective nozzles at low combustion rates will be greatly reduced. This may result in odorous emissions and other consequences of insufficient furnace turbulence may result.

Variable area nozzles are known in the industry that operate by closing off the top of the fixed nozzle by lowering a damper or guillotine. Such apparatus has not been satisfactory because of friction involved in moving the damper. In addition such mechanisms have been vulnerable due to jamming caused by to thermal distortions since they are located close to the opening in the furnace wall. Also because of the location close to the furnace wall opening the mechanism is exposed to hot ash and molten materials. This results in slag formations on movable parts when the molten material and hot ash are exposed to the lower temperatures of the combustion air passing through the nozzle.

In the prior art structure the closing off of the top of the opening in the furnace wall may cause molten material to run down over the inactive area of the nozzle and solidify. This will tend to cause the damper to be locked in the closed position by the solidified material. The solidified material is not accessible to poke rods because the prior art damper will prevent insertion of a rod. Still another disadvantage of the prior art mechanisms is that space has to be provided above the nozzle location to accommodate the damper and the damper operating mechanism. Each such nozzle is coupled to a duct immediately above the nozzle. Because of the location of the prior art operating mechanism and damper near the top of the nozzle opening each windbox must be about twice as high as the nozzle opening. In order to provide clear space for the damper and damper operating mechanism the location of the nozzle opening is usually lower in the furnace than is desirable for optimum combustion.

Known variable area nozzles have been found to produce a low pressure area just above the jet of air entering the furnace from the nozzle when the damper is partly closed. This low pressure area extends into the cavity above the damper. The low pressure area pulls hot dirty furnace gases into the top of the nozzle and causes the over heating and plugging that frequently occurs.

It is an object of the invention to provide apparatus which will be substantially insensitive to the effect of thermal expansion and contraction of the component parts.

Still another object of the invention to provide apparatus will have relatively little friction.

Another object of the invention is to provide apparatus which has moving parts which are located away from the hot ash and molten material that are present in the interior of the furnace.

Yet another object of the invention is to provide apparatus which will allow location of the air nozzle in a position which will provide for optimum combustion.

Still another object of the invention is to provide apparatus which will minimize pulling furnace gases into the nozzle and thus minimizes the occurrence of overheating and plugging as a result of pulling such gases into the nozzle.

SUMMARY OF THE INVENTION

It has now been found that these and other objects of the invention may now be attained in an air nozzle assembly for use in associated combustion apparatus which includes a first elongated housing having first and second axial extremities. The first axial extremity thereof is open to the interior of the first housing and tapers axially from a larger to a smaller cross section that constitutes a generally flat nozzle at the first axial extremity. A second elongated housing has first and second axial extremities. The first axial extremity is open to the interior of the second housing, at least the first axial extremity and an axial portion of the second elongated housing are dimensioned and configured to extend with at least the first axial portion disposed within the first elongated housing. The first axial portion tapers axially from a larger to a smaller cross section at the first axial extremity. The apparatus also includes means for selectively preventing flow in the second elongated housing.

In some forms of the invention the first and second housings each include an axis and the respective axes are substantially aligned or in some cases in coincident relationship. The means for selectively preventing flow in the second elongated housing may be damper which may be generally planar.

The damper may be mounted for pivotal motion between a first position wherein the damper is blocking flow through the second housing and a second position wherein the damper is not blocking flow through the second housing. The apparatus also may include means for pivotally moving the damper which may be generally rectangular. In various embodiments the damper is pivotally mounted about an axis that extends substantially coincident with an edge of the damper.

The damper may have rectilinear sides and include a first pair of opposed sides and a second pair of opposed sides. The second pair of opposed sides may be longer than the first sides and the axis referred to above may be substantially coincident with one of the second sides. The means for pivotally moving the damper may include a first arm fixed thereto which may be disposed in substantially coplanar relationship with the damper. The first arm is elongated and has first and second axial extremities in some embodiments. The apparatus further includes a second arm that has first and second axial extremities and the first axial extremity of the first arm and the first axial extremity of the second arm are pivotally connected.

In some embodiments the first axial extremity of the outer housing is closer to the combustion within the associated furnace apparatus than the first axial extremity of the inner housing.

The first axial extremity of the outer housing may have all points thereof disposed within a first plane and the first axial extremity of the inner housing may have all points thereof disposed within a second plane that is generally vertical and disposed in perpendicular relationship to the axis of the inner housing. The first and second planes may be disposed in spaced relation and the first plane may be generally vertical and disposed in perpendicular relationship to the axis of the outer housing. The second plane may be generally vertical and disposed in perpendicular relationship to the axis of the inner housing.

BRIEF DESCRIPTION OF THE DRAWING

The invention will be better understood by reference of the accompanying drawing in which.

DESCRIPTION OF THE PREFERRED EMBODIMENT

A chemical recovery boiler shares the general appearance and many of the physical components with a power boiler. Typically, such apparatus must generate steam for paper-mill power and process demands and must chemically restore the inorganic components of a black liquor to a form that can be reprocessed into the chemicals required by the digester. The chemical recovery unit is an integral part of the kraft pulping process that process produces long-fibers pulp used in making high-strength paper.

Figure 1:
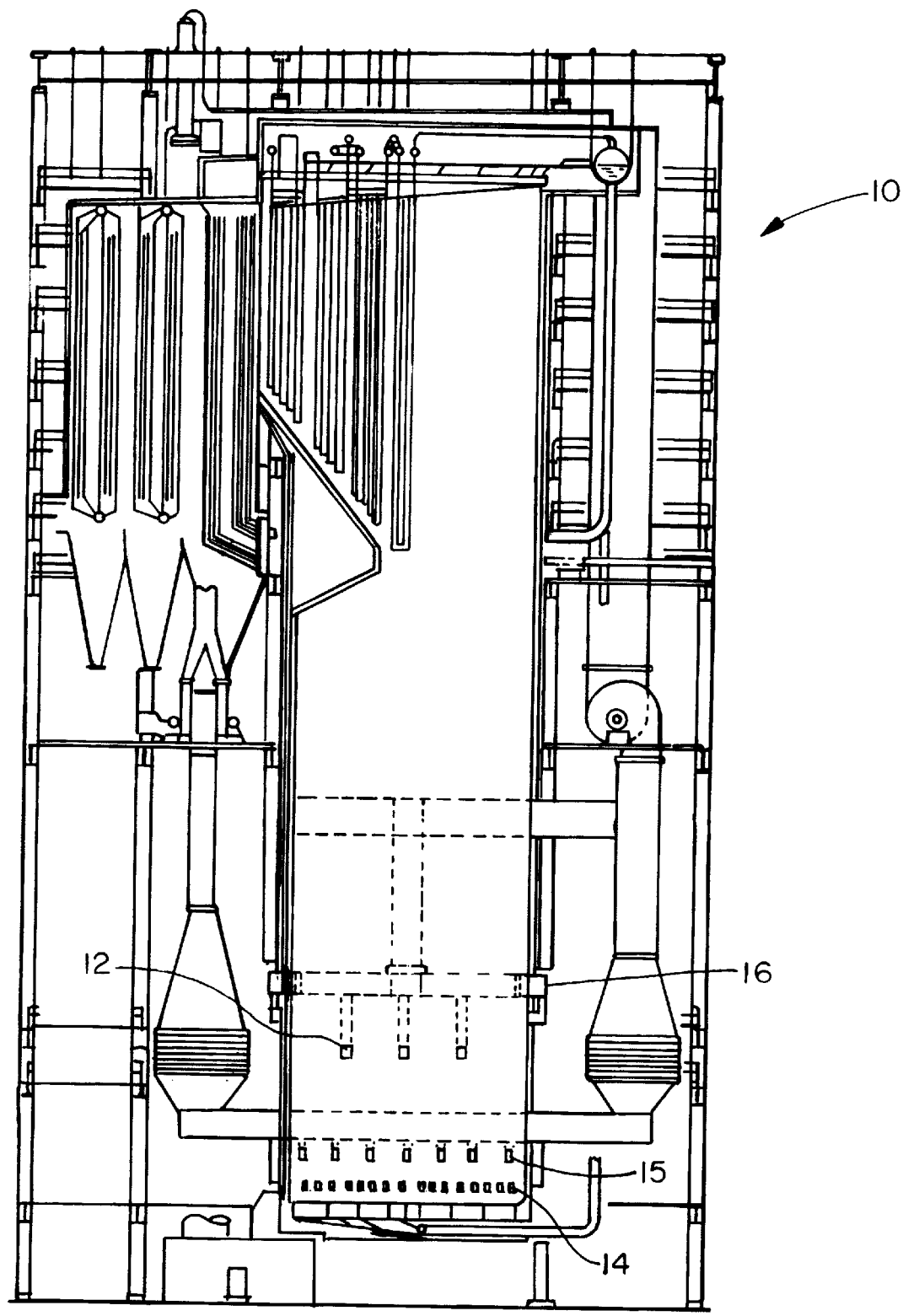
FIG. 1 is a diagrammatic representation of a vertical section of a chemical recovery unit into which present apparatus may be installed.

Referring now to FIG. 1 there is shown a chemical recovery unit furnace 10 into which residual liquor obtained in a chemical digestion process is introduced through the openings 12, 12 by means of suitable nozzles not shown. This liquor which has been suitably concentrated prior to its introduction descends towards the furnace bottom with moisture being driven there from with portions of the liquor burning during descent and with the dried liquor collecting on the bottom or hearth of the furnace where the burning continues with molten chemical being withdrawn through spout 13. Combustion supporting air is directed generally at the pile of char and fused materials on the bottom of the furnace through the primary air openings 14 with additional combustion supporting air being directed into the furnace through secondary air openings 15 and tertiary air openings 16.

The furnace 10 has the walls thereof lined with steam generating tubes which are connected at there upper ends with a steam and water drum 18 which forms part of the boiler or steam generating portion of the chemical recovery unit furnace 10. At the rear (the left side as viewed in FIG. 1) of the upper end of the furnace 10 is provided an opening through which the combustion gases pass. More particularly these gases pass through the vertically disposed gas pass 20 to downstream heat transfer surfaces.

In a typical arrangement a black liquor is sprayed into the furnace through black-liquor spraying nozzle 12 disposed around the chemical recovery unit furnace. The liquor is typically evaporated to a firing concentration of about 65–75% solids. Primary air is introduced through openings 14 simultaneously from four sides of the furnace at a lower level of about three and a half feet above the furnace bottom. Secondary air is introduced through a plurality of registers 15 typically that are disposed at a higher elevation than the primary air openings 14.

Tertiary air nozzles openings 16 are disposed above the secondary air registers 15, Secondary and tertiary air, sometimes referred to as over spray air, is necessary to complete the combustion process. For the details of the construction of such apparatus reference is made to Combustion Fossil Power Systems, A Reference Book on Fuel Burning and Steam Generation edited by Joseph G. Singer and published by Combustion Engineering, 1000 Prospect Hill Road, Windsor, Conn. Copyright 1981 .

Figure 2:
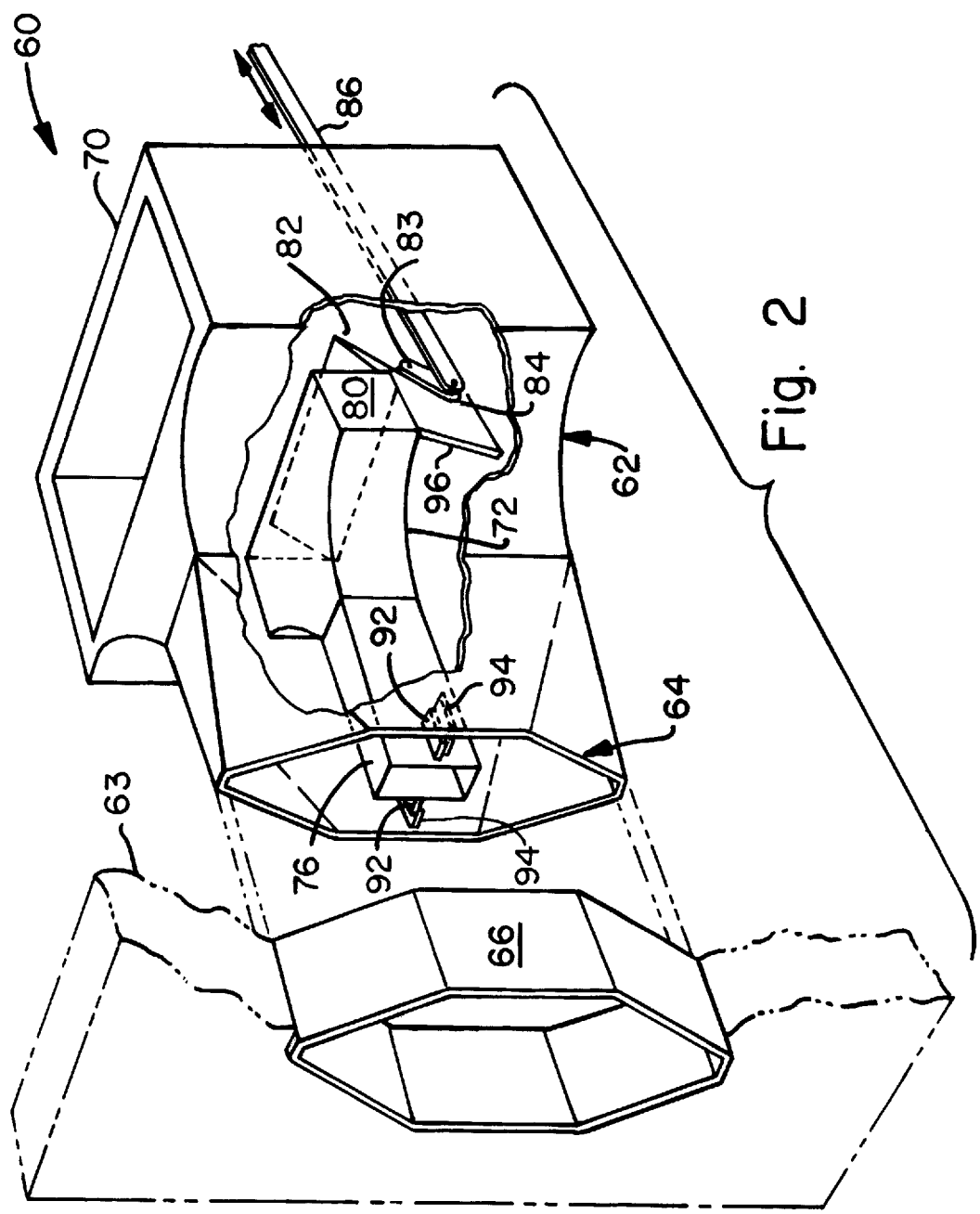
FIG. 2 is a perspective view of a variable area discharge nozzle in accordance with one form of the invention.

Referring more specifically to FIG. 2 there is shown a variable area nozzle assembly 60 in accordance with one form of the invention. Respective nozzles of this type are disposed to direct air into each secondary air opening 15 and each tertiary air opening 16 of the furnace 10. More specifically, the nozzle assembly includes an outer housing 62 having an outlet 64. The outlet 64 is joined to the furnace 10 by a seal box 63. The seal box 63 mates with an outlet sleeve 66 dimensioned and configured to engage the outer surface of the sleeve 64 of the nozzle assembly 60.

The sleeve 64 extends vertically more than horizontally and has a cross-section that is generally shaped like a polygon having an even number of sides. Opposite sides of the sleeve 64 are generally parallel, planar and of equal size in the preferred embodiment. Ordinarily, end face of the sleeve 66 will have all points thereof disposed within a first plane that is generally vertical and disposed in perpendicular relationship to the axis of the outer housing 62. In other forms of the invention the outlet will have other shapes.

The rear face of the box 80 is open and generally rectangular with the longer side thereof being disposed generally horizontally. A generally rectangular damper 82 that is dimensioned and configured for seating engagement with the rear face of the box 80. The damper 82 is mounted for pivotal movement about an axis 83 which will be understood to be coincident with the lower long side of the damper 82. More specifically, the damper 82 may move when pivoted about the axis 83 between a generally vertical position that will obstruct flow into the second housing 72 and a generally horizontal position that will not cause major obstruction of the flow through the second housing 72.

Fixed to the damper 82 is a first arm 84. The first arm 84 has first and second axial extremities. The first axial extremity thereof is pivotally connected to a first axial extremity of the second arm 86. The second axial extremity of the first arm is fixed to the damper 82. As will be apparent from the drawing the first arm 84 is substantially coplanar with the damper 82.

The inner housing 72 is supported within the outer housing 62 by laterally extending tabs 92, 92 that extend from the inner housing 72 and cooperate with laterally extending tabs 94, 94 that extend inwardly from the inner face of the outer housing 62. Two planar supports 96 (one shown) extend between the box 80 and the outer housing 62 to provide additional support for the inner housing 62.

Ordinarily, the first housing 62 and the second housing 72 are disposed in coaxial relationship. As described above ordinarily, the axial extremity of the sleeve 66 will have all points thereof disposed within a first plane that is generally vertical and disposed in perpendicular relationship to the axis of the outer housing 62. Similarly, the outlet 76 of the second housing will have all points of the end face thereof disposed within a second plane that is generally vertical and disposed in perpendicular relationship to the axis of the outer and inner housings 62, 72. Ordinarily the second plane will be spaced away from the first plane. This spacing may be in the order of one inch. In other words the tip or axial extremity of the second housing 72 is spaced further away from the combustion (not shown) than the axial extremity of the sleeve 66. 60 is providing air to than the tip of the outer housing 62.

In the preferred embodiment, that has been illustrated, the housing tapers from the outlet 64 to a generally vertically extending combustion air chamber 70. The combustion air chamber is part of a plenum that includes a plurality of such combustion air chambers 70 disposed in a generally vertically extending array. For simplicity only one such chamber 70 is shown.

Those skilled in the art will also recognize that the typical furnace will not only have a plurality of chambers coupled together but also a plurality of housings stacked in a column with the outlets facing the combustion zone of the furnace 10.

Disposed within the outer housing 70 is an inner housing 72 having a similar but smaller shape than the outer housing 62. The inner housing tapers from an outlet 76 to horizontally elongated box 80. The outlet 76 is substantially coaxially disposed with respect to the outlet 66. In the preferred embodiment the outlet 76 and the box 80 each have a rectangular cross-section.

Advantageously, the axial extremity of the outlet 76 abuts an imaginary plane that is further away from the interior of the furnace 10 than an imaginary plane that abuts the axial extremity of the sleeve 66. In other words the axial extremity or tip of the outlet 76 is further away from the fire and contamination within the furnace 10 than the axial extremity or tip of the sleeve 66.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described my invention I claim:

1. An air nozzle assembly for use in associated combustion apparatus to supply combustion air for combustion within the combustion apparatus which comprises:

a first housing, said first housing being elongated in a direction that is coincident with an axis thereof said first housing (a) having an interior, (b) having first and second ends and (c) having first and second axial portions that respectively include said first and second ends, said second axial portion communicating with said interior of said first housing and tapering axially from a smaller cross section to a larger cross section at said second end, said first end having a cross section dimension perpendicular to said axis that is greater in a first direction than in a second direction, said first direction being perpendicular to said second direction;

a second housing, said second housing being elongated in a direction that is coincident with an axis thereof, said second housing (a) having an interior, (b) having first and second ends and (c) having first and second axial portions that respectively include said first and second ends, said first axial portion of said second housing being open to the interior of said second housing, at least said first axial portion of said second housing being disposed within said first housing, said second axial portion of said second housing tapering axially from a smaller to a larger cross section at said second end; and means for selectively preventing flow in said second housing.

2. The apparatus as described in claim 1 wherein:

said axis of said first housing and said axis of said second housings are aligned.

3. The apparatus as described in claim 2 wherein:

said axis of said first housing and said axis of said second housing are coincident.

4. The apparatus as described in claim 3 wherein:

said means for selectively preventing flow in said second housing is a damper.

5. The apparatus as described in claim 4 wherein:

said damper is planar.

6. The apparatus as described in claim 5 wherein:

said damper is mounted for pivotal motion between a first position wherein said damper is blocking flow through said second housing and a second position wherein said damper is not blocking flow through said second housing.

7. The apparatus as described in claim 6 further including:

means for pivotally moving said damper.

8. The apparatus as described in claim 7 wherein:

said damper is rectangular.

9. The apparatus as described in claim 8 wherein:

said damper is pivotally mounted about an axis that extends coincident with an edge of said damper.

10. The apparatus as described in claim 9 wherein:

said damper has rectilinear sides and including a first pair of opposed sides and a second pair of opposed sides, said second pair of opposed sides being longer than said first sides, said axis about which said damper is pivotally mounted being coincident with one of said second sides.

11. The apparatus as described in claim 10 wherein:

means for pivotally moving said damper includes a first arm fixed thereto.

12. The apparatus as described in claim 11 wherein:

said first arm is disposed in coplanar relationship with said damper.

13. The apparatus as described in claim 12 wherein:

said first arm is elongated and has first and second axial extremities, and said apparatus further includes a second arm, said second arm having first and second axial extremities, said first axial extremity of said first arm and said first axial extremity of said second arm being pivotally connected.

14. The apparatus as described in claim 13 wherein:

(a) said first end of said first housing is closer to a part of the associated combustion apparatus wherein combustion takes place within the associated combustion apparatus than (b) said first end of said second housing.

15. The apparatus as described in claim 14 wherein:

said first end of said first housing has all points thereof disposed within a first plane.

16. The apparatus as described in claim 15 wherein:

said first end of said second housing has all points thereof disposed within a second plane.

17. The apparatus as described in claim 16 wherein:

said first and second planes are disposed in spaced relation.

18. The apparatus as described in claim 17 wherein:

said first plane is vertical and disposed in perpendicular relationship to the axis of said first housing.

19. The apparatus as described in claim 18 wherein:

said second plane is vertical and disposed in perpendicular relationship to the axis of said second housing.

* * * * *